United States Patent
Kao et al.

(10) Patent No.: US 8,058,356 B2
(45) Date of Patent: Nov. 15, 2011

(54) METHOD FOR MANUFACTURING HYDROGENATED BLOCK COPOLYMER

(75) Inventors: Huan-Chun Kao, Kaohsiung (TW);
Sheng-Te Yang, Hsinchu (TW);
Hung-Chieh Hou, Pingtung (TW);
Chung-Ming Tsai, Neipu Shiang (TW)

(73) Assignee: TSRC Corporation, Taipei (TW)

( * ) Notice: Subject to any disclaimer, the term of this patent is extended or adjusted under 35 U.S.C. 154(b) by 352 days.

(21) Appl. No.: 12/368,824

(22) Filed: Feb. 10, 2009

(65) Prior Publication Data

US 2010/0168298 A1 Jul. 1, 2010

(30) Foreign Application Priority Data

Dec. 30, 2008 (TW) ............................... 97151484 A

(51) Int. Cl.
*C08F 8/04* (2006.01)
(52) U.S. Cl. ...................... 525/338; 525/332.9; 525/339
(58) Field of Classification Search .................. 525/338, 525/339
See application file for complete search history.

(56) References Cited

U.S. PATENT DOCUMENTS

| 3,234,994 | A | 2/1966 | Dance |
| 5,612,422 | A | 3/1997 | Hucul et al. |
| 6,350,820 | B1 | 2/2002 | Hahnfeld et al. |
| 6,376,621 | B1 | 4/2002 | Hahnfeld et al. |
| 6,376,622 | B1 | 4/2002 | Hucul |
| 6,395,841 | B1 | 5/2002 | Calverley et al. |
| 6,399,538 | B1 | 6/2002 | Hucul |
| 6,433,102 | B1 * | 8/2002 | Suzuki et al. .............. 525/333.3 |
| 6,451,924 | B1 | 9/2002 | Hahnfeld et al. |
| 6,455,656 | B2 | 9/2002 | Hahnfeld et al. |
| 6,583,230 | B2 | 6/2003 | Hahn et al. |
| 6,632,890 | B1 | 10/2003 | Bates et al. |
| 6,962,960 | B1 | 11/2005 | Daumerie et al. |

FOREIGN PATENT DOCUMENTS

| EP | 1369437 | 12/2003 |
| EP | 1422253 | 5/2004 |

* cited by examiner

*Primary Examiner* — Bernard Lipman
(74) *Attorney, Agent, or Firm* — Snell & Wilmer L.L.P.

(57) ABSTRACT

The present invention relates to a method for manufacturing a substantially hydrogenated vinyl aromatic/conjugated diene block copolymer, which has a hydrogenation level of greater than 90 percent. The resulting substantially hydrogenated vinyl aromatic/conjugated diene block copolymer has advantageous physical properties suitable for use in discs, optical films, light guide plates, etc.

19 Claims, 2 Drawing Sheets

METHOD FOR MANUFACTURING HYDROGENATED BLOCK COPOLYMER

CROSS-REFERENCE TO RELATED APPLICATIONS

This application claims the right of priority based on Taiwan Patent Application No. 097151484 entitled "METHOD FOR MANUFACTURING HYDRONGENATED BLOCK COPOLYMER" filed on Dec. 30, 2008, which is incorporated herein by reference.

FIELD OF INVENTION

The present invention relates to a method for manufacturing hydrogenated block copolymers, and more particularly to a method for mass manufacturing substantially hydrogenated vinyl aromatic/conjugated diene block copolymers.

DESCRIPTION OF THE RELATED ART

Vinyl aromatic/conjugated diene block copolymers are typically comprised of vinyl aromatic polymer block(s) and conjugated diene polymer block(s). Partially hydrogenated vinyl aromatic/conjugated diene block copolymers such as partially hydrogenated styrene-butadiene-styrene copolymers which is named SEBS (Styrene-Ethylene-Butylene-Styrene) or partially hydrogenated styrene-isoprene-styrene copolymers which is named SEBS (Styrene-Ethylene-Propylene-Styrene) are well known in the art. As used herein, the term "partially hydrogenated" refers to hydrogenation of the diene portion greater than 95 percent but hydrogenation of aromatic rings lower than 90 percent. Although these partially hydrogenated vinyl aromatic/conjugated diene block copolymers have been applied into various applications, they suffer from one or more shortcomings, including low heat resistance, poor physical properties, poor processability and poor light stability. Attempts have been made to remedy these shortcomings by increasing the hydrogenation of the aromatic rings of the block copolymers.

A substantially hydrogenated vinyl aromatic/conjugated diene block copolymer means having a hydrogenation level of greater than 90 percent. The substantially hydrogenated vinyl aromatic/conjugated diene block copolymer has advantages of high transparency, high glass transition temperature, low water absorption, good strength, good toughness, good weatherability, excellent melt processability and low birefringence, which make these materials ideal candidates for many applications including optical disc articles, fabricated articles, thermoformed articles, extruded articles, injection molded articles, films and the like.

Since the substantially hydrogenated vinyl aromatic/conjugated diene block copolymer can be widely applied in many fields, there arises a need for a method for mass manufacturing the substantially hydrogenated vinyl aromatic/conjugated diene block copolymers.

SUMMARY OF THE INVENTION

It is an object of the present invention to provide a method for manufacturing a substantially hydrogenated vinyl aromatic/conjugated diene block copolymer, which has a hydrogenation level of greater than 90 percent, preferably greater than 95 percent, and more preferably greater than 99 percent. The term "hydrogenation level" refers to the percentage of the original unsaturated bonds of the aromatic portion which become saturated upon hydrogenation.

It is another object of the present invention to provide a solvent removal process suitable for removing a process solvent from a polymer solution of a substantially hydrogenated vinyl aromatic/conjugated diene block copolymer.

In one embodiment of the invention, a method for manufacturing a substantially hydrogenated vinyl aromatic/conjugated diene block copolymer comprises hydrogenating a block copolymer of a vinyl aromatic polymer block and a conjugated diene polymer block by contacting with a hydrogenating agent in the presence of a hydrogenation catalyst to obtain a polymer solution including a hydrogenated block copolymer having a hydrogenation level of greater than 90 percent and a solvent; removing the solvent from the polymer solution by a flash devolatilization at a temperature of 200 to 300° C. and a pressure of 1 to 10 Bar to obtain a concentrated polymer solution with a residual solvent in an amount of 1 to 50 weight percent based on the total weight of the concentrated polymer solution; and removing the residual solvent from the concentrated polymer solution by a devolatilizer at a pressure below 100 torr, and preferably below 20 torr, to isolate the hydrogenated block copolymer. In the embodiment, the polymer solution is preferably maintained at a pressure of 9 to 30 Bar and preheated to be at a temperature range of 200 to 300° C. before entering into a flask tank to remove the solvent from the polymer solution by the flash devolatilization. The solvent of the polymer solution is allowed to flash off while the polymer solution enters into the flash tank at a lower pressure.

In the embodiment of the present invention, the pressure used during the flash devolatilization is higher than the pressure normally used, such that it is beneficial to provide the concentrated polymer solution including the hydrogenated block copolymer with a residual solvent, which makes the concentrated polymer solution not too sticky and easier for subsequent processing. Besides, the processing temperature suitable for the flash devolatilization can be lowered to a temperature below the melt temperature of the hydrogenated block copolymer by increasing the pressure used; thus the hydrogenated block copolymer can be prevented from degradation.

In the process of removing the solvent of the polymer solution, most of the solvent may be firstly removed by flash devolatilization to obtain a concentrated polymer solution with a residual solvent in an amount of 1 to 50 weight percent, preferably of 1 to 15 weight percent, based on the total weight of the concentrated polymer solution; and then the concentrated hydrogenated block copolymer can be transferred to a twin-screw extruder, a film evaporator, a double flash tank or an assembly of the above to further remove the residual solvent such as under vacuum (e.g. below 20 torr). According to the present invention, the two-step process for removing the solvent from the polymer solution can be used not only to purify the hydrogenated vinyl aromatic/conjugated diene block copolymer in an efficient and effective way, but also to produce the hydrogenated block copolymer with desired properties, such as excellent processability and high transparency.

The resulting substantially hydrogenated vinyl aromatic/conjugated diene block copolymer has advantageous physical properties suitable for use in discs, optical films, light guide plates, etc.

BRIEF DESCRIPTION OF THE DRAWINGS

For a better understanding of the present invention, reference is made to a detailed description to be read in conjunction with the accompanying drawings, in which.

DESCRIPTION OF THE PREFERRED EMBODIMENTS

Figure 1:
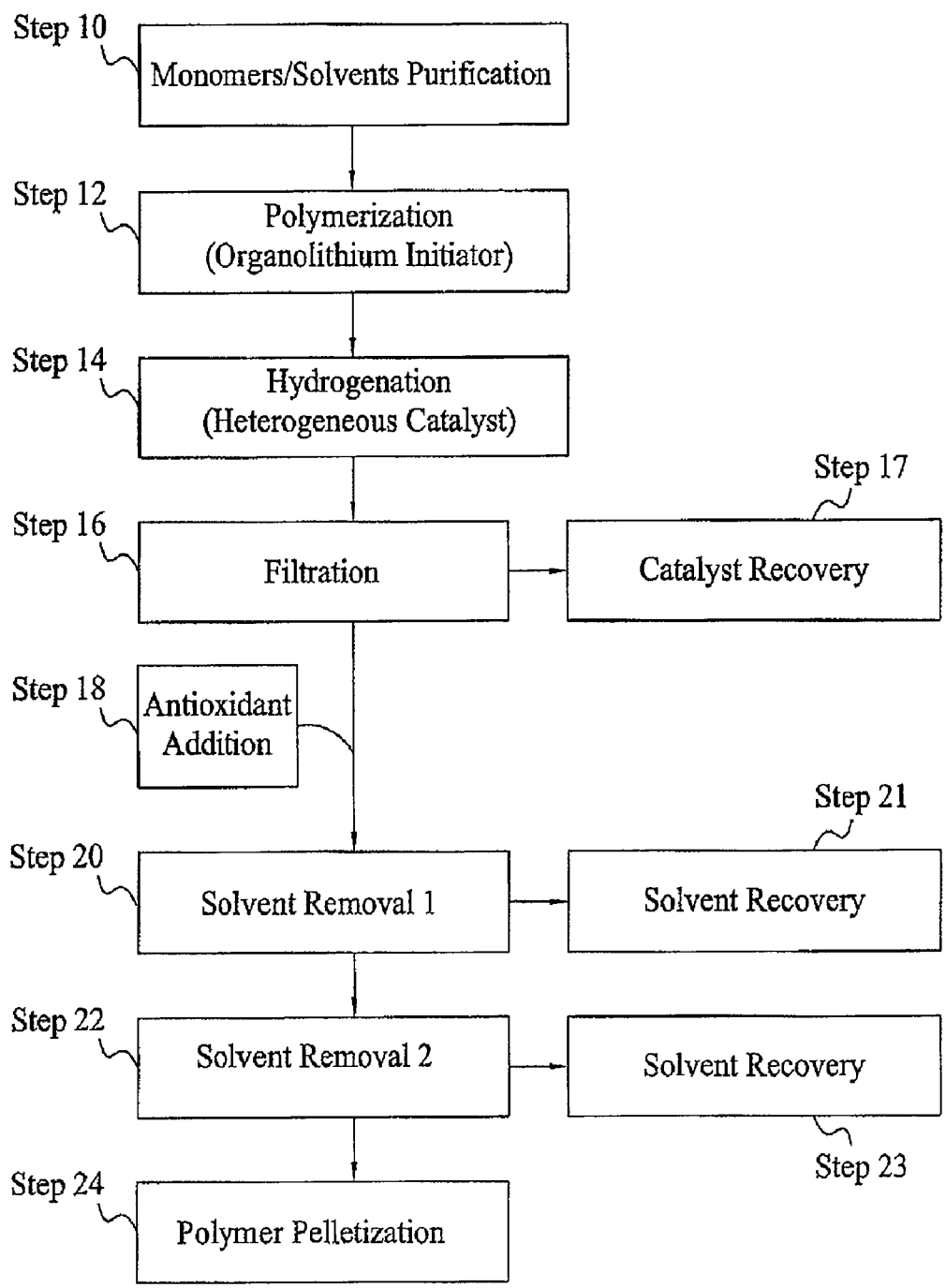
FIG. 1 illustrates a flow chart showing a method for manufacturing a substantially hydrogenated vinyl aromatic/conjugated diene block copolymer according to one embodiment of the present invention.

Methods of hydrogenating vinyl aromatic/conjugated diene block copolymers and applications of the hydrogenated vinyl aromatic/conjugated diene block copolymers are well known in the art, such as those disclosed in U.S. Pat. Nos. 6,376,622, 6,399,538, 5,612,422, 6,395,841, 6,455,656, 6,350,820, 6,376,621, 6,451,924, 6,583,230 and 6,632,890, which are incorporated herein by reference. However, a solvent removal process for purifying the substantially hydrogenated vinyl aromatic/conjugated diene block copolymers with a high hydrogenation level of greater than 90 percent is not discussed in these references.

One embodiment of the present invention relates to a method for mass manufacturing a substantially hydrogenated vinyl aromatic/conjugated diene block copolymer, which comprises providing a polymer solution including a hydrogenated vinyl aromatic/conjugated diene block copolymer having a hydrogenation level of greater than 90 percent and a solvent, and removing the solvent from the polymer solution to isolate the hydrogenated vinyl aromatic/conjugated diene block copolymer. The hydrogenated vinyl aromatic/conjugated diene block copolymer is formed by hydrogenating a block copolymer of a vinyl aromatic polymer block and a conjugated diene polymer block by contacting with a hydrogenating agent in the presence of a hydrogenation catalyst.

In one embodiment, the vinyl aromatic polymer block can be polymerized from vinyl aromatic monomers including: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. The conjugated diene polymer block can be polymerized from conjugated diene monomers, for example, including 1,3-butadiene, 2-methyl-1,3 pentadiene, isoprene and similar compounds, and mixtures thereof.

A block is herein defined as a polymeric segment of a copolymer which exhibits microphase separation from a structurally or compositionally different polymeric segment of the copolymer. Microphase separation occurs due to the incompatibility or partial incompatibility of the polymeric segments within the block copolymer. Microphase separation and block copolymers are widely discussed in "Block Copolymers-Designer Soft Materials", PHYSICS TODAY, February, 1999, pages 32-38.

In the embodiment of the present invention, the block copolymer is preferably a copolymer polymerized from at least a vinyl aromatic monomer and at least a conjugated diene monomer. The vinyl aromatic/conjugated diene block copolymer can be formed by an anionic polymerization, examples of which are cited in Anionic Polymerization: Principles and Practical Applications, H. L. Hsieh and R. P. Quirk, Marcel Dekker, New York, 1996. It is advantageous to use organolithium compounds such as ethyl-, propyl-, isopropyl-, n-butyl-, sec.-butyl-, tert.-butyl, phenyl-, hexyl-diphenyl-, butadienyl-, polystyryl-lithium, or the multifunctional compounds hexamethylene-dilithium, 1,4-dilithium-butane, 1,6-dilithium-hexane, 1,4-dilithium-2-butene, or 1,4-dilithium-benzene. Preferably, the initiator is n-butyl- and/or sec.-butyllithium. The amount of initiator is well known in the art and can easily be ascertained by one skilled in the art without undue experimentation.

In the embodiment of the present invention, the vinyl aromatic polymer block is preferably polymerized from styrene, and the conjugated diene polymer block is preferably polymerized from butadiene or isoprene. The block copolymer preferably has a number average molecular weight of 40000 to 150000, and more preferably of 40000 to 80000. A weight ratio of the vinyl aromatic polymer block to the conjugated diene polymer block in the block copolymer is preferably from about 40:60 to about 90:10.

The vinyl aromatic/conjugated diene block copolymer polymerization is typically conducted in the presence of a saturated hydrocarbon solvent or ether, benzene, toluene, xylene or ethylbenzene, and is preferably a non-polar hydrocarbon solvent, such as cyclohexane or methylcyclohexane.

The block copolymer can be hydrogenated using a hydrogenation catalyst including a Group VIII metal component and at least one component selected from the group consisting of a rhenium, molybdenum, tungsten, tantalum, niobium and platinum. The hydrogenation catalyst can consist of the components alone, but preferably the hydrogenation catalyst additionally comprises a support (e.g. a silica, alumina or carbon) on which the components are deposited. The support such as silica may preferably have a pore size such that at least 98 percent of the pore volume measured by mercury porosimetry is defined by pores having diameter of greater than 600 angstroms.

The hydrogenation reaction is preferably conducted in a non-polar hydrocarbon solvent in which the polymer is soluble and which will not hinder the hydrogenation reaction. The solvent is preferably the same solvent in which the polymerization was conducted.

The temperature at which the hydrogenation reaction is conducted can be any temperature at which hydrogenation occurs without significant degradation of the polymer. Degradation of the polymer can be detected by a decrease in Mn, an increase in polydispersity or a decrease in glass transition temperature, after hydrogenation. Typical hydrogenation temperatures are from about 40° C. preferably from about 100° C., more preferably from about 110° C., and most preferably from about 120° C. to about 250° C., preferably to about 200° C., more preferably to about 180° C., and most preferably to about 170° C.

The hydrogenating agent can be any hydrogen producing compound which will efficiently hydrogenate the unsaturated polymer. Hydrogenating agents include but are not limited to hydrogen gas, hydrazine and sodium borohydride. Preferably, the hydrogenating agent is hydrogen gas.

After the hydrogenation process, the hydrogenation catalyst can be filtered and recovered for reuse.

A solvent removal process is generally applied in the art to remove residual monomers, process solvents, and other volatile components from polymer solutions, i.e. to purify or isolate polymers from the solutions. Suitable solvent removal processes known in the art include, but are not limited to, flash devolatilization, precipitation, distillation, spray drying and film evaporation to remove the solvent from the polymer solutions. The several processes described herein for purifying or isolating polymers may be used alone or in combination, which can be of various designs according to various polymer types and/or specific needs.

In the embodiment, a two-step solvent removal process is specifically provided to remove the solvent and to purify the substantially hydrogenated block copolymers in an efficient and effective way without affecting their desirable properties such as transparency. In the process of removing the solvent of the polymer solution, most of the solvent may be firstly removed by a flash devolatilization to obtain a concentrated polymer solution with a residual solvent in an amount of 1 to 50 weight percent, and preferably of 1 to 15 weight percent. In this step, according to the solvent used, the polymer solution can be maintained at a pressure of 9 to 30 Bar and preheated by a heat exchanger to be maintained at a temperature of 200 to 300° C., and then transferred into a flask tank to remove the solvent from the polymer solution. The flash tank can be performed at a temperature of 200 to 300° C. and at a pressure of 1 to 10 Bar, and then the solvent of the polymer solution is allowed to flash off while the polymer solution is entering into the flash tank at a lower pressure. The removed solvent can thus be condensed and recovered.

Subsequently, the concentrated polymer solution can be transferred to a devolatilizer to further remove the residual solvent and isolate the hydrogenated block copolymer at a pressure below 100 torr, and preferably below 20 torr. The devolatilizer can be a twin-screw extruder or a film evaporator, and the twin-screw extruder is mostly preferred. The residual solvent removed can be recovered for reuse.

An antioxidant can be added into the polymer solution after filtering out the hydrogenation catalyst and prior to removing the solvent from the polymer solution, thus the resulting hydrogenated block copolymer can be prevented from being oxidized or changing color due to the high temperature of the polymer solution. In one embodiment, the antioxidant can comprise a hindered phenolic antioxidant and/or a phosphate ester antioxidant, and the decomposition temperature of the above is preferably more than 150° C.

According to the present invention, the two-step process for removing the solvent from the polymer solution can be used to separate the hydrogenated vinyl aromatic/conjugated diene block copolymer from polymer solution in an efficient and effective way, and the resulting substantially hydrogenated vinyl aromatic/conjugated diene block copolymers have advantageous physical properties of high transparency, high glass transition temperature, low water absorption, good strength, good toughness, good weatherability, excellent melt processability and low birefringence, which make them specifically suitable for use in discs, optical films, light guide plates, etc.

The following embodiments are provided to illustrate the present invention only, and are not intended to limit the scope of the present invention. Amounts are in weight parts or weight percentages unless otherwise indicated.

Embodiments

Figure 2:
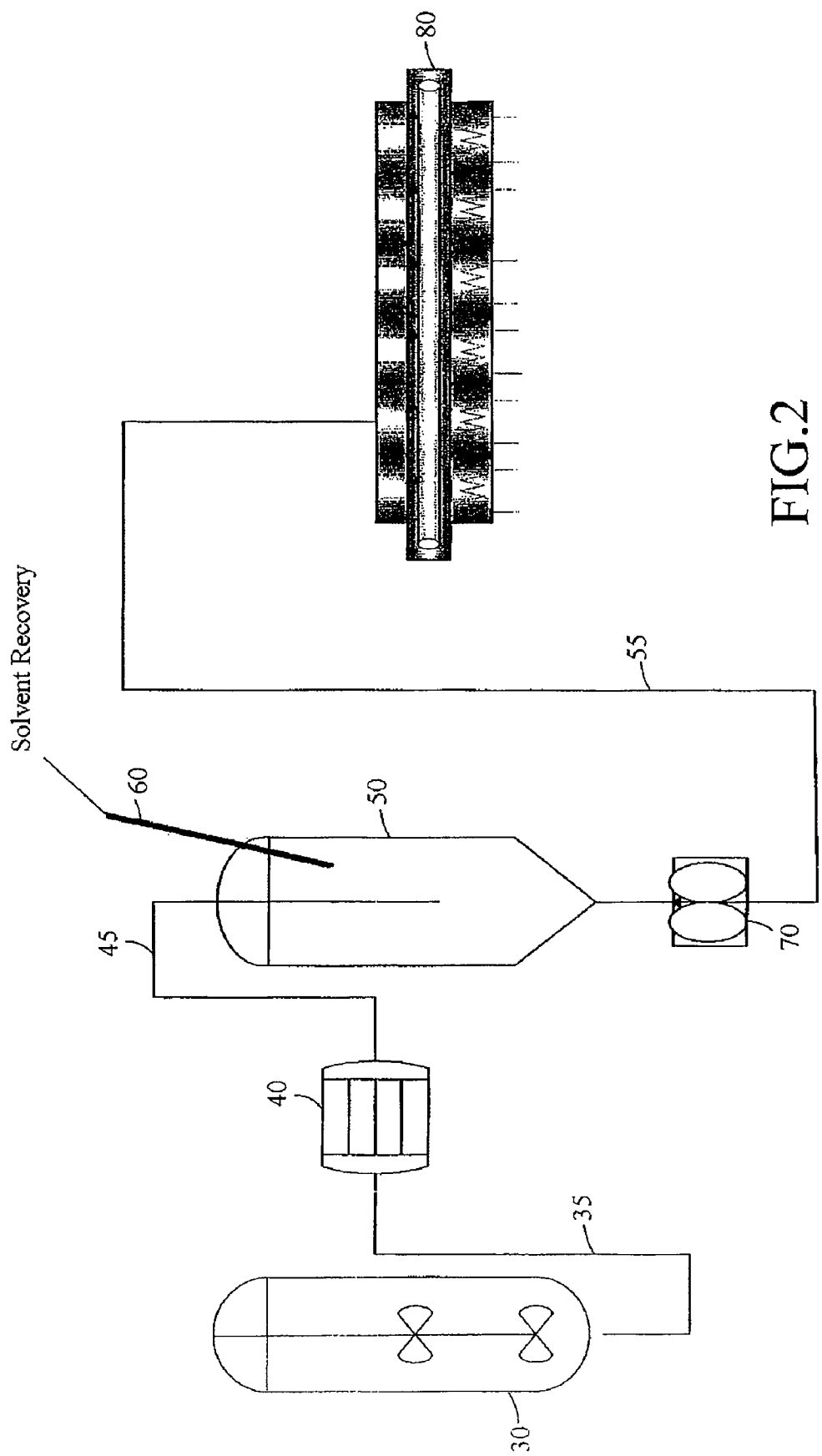
FIG. 2 illustrates a schematic representation of a devolatilization system according to one embodiment of the present invention.

For a better understanding of the present invention, the following detailed description is read with reference to FIGS. 1 and 2, in which FIG. 1 illustrates a flow chart showing a method for manufacturing a substantially hydrogenated vinyl aromatic/conjugated diene block copolymer according to one embodiment of the present invention, and FIG. 2 illustrates a schematic representation of a devolatilization system according to one embodiment of the present invention.

Impurities and water existing in the solvent and monomers will influence the activities of polymerization catalysts if they are not removed prior to entering the polymerization system. The significant amount of the impurities will reduce catalyst efficiency and cause the desired molecular weight of the polymer solution become unavailable.

Drying towers being filled with dewatered and activated aluminum oxide are typically used for adsorbing water and impurities in the solvent and monomers. Although industrial grade solvents such as cyclohexane, butadiene and styrene normally have been subjected to drying towers, the remained impurities and water are still sufficient to affect the results of polymerization. Therefore, monomers such as butadiene and styrene, and cyclohexane solvent are further subjected to a purification and dewatering step, as shown in step 10 of FIG. 1. In practice, the impurities and water remained in the solvent and monomers will be reduced to a level below 10 ppm after performing the additional purification and dewatering step 10.

In the polymerization step 12, 800 kg cyclohexane solvent is firstly loaded into a 2000 L reactor vessel. A specific amount of vinyl aromatic monomers is divided into three equal parts, and a specific amount of conjugated diene monomers is divided into two equal parts, and then a pentablock copolymer is prepared by sequential and alternate addition of one part of the vinyl aromatic monomers and one part of the conjugated diene monomers for five times. In Embodiment 1, 149 kg of styrene monomers is divided into three equal parts, 25 kg of butadiene monomers is divided into two equal parts, and a pentablock copolymer of styrene-butadiene-styrene-butadiene-styrene is formed by sequential and alternate addition of one part of the styrene monomers and one part of the butadiene monomers for five times in the presence of lithium as an organolithium initiator.

The polymerization reaction is conducted from a start temperature of 50° C. to a temperature less than 100° C. during polymerization period. Due to the reaction heat generated, the reaction pressure increases as the temperature increases while the reactants are gradually added into the reactor vessel.

After the pentablock copolymer of styrene-butadiene-styrene-butadiene-styrene is obtained, the polymerization reaction is terminated by adding a polymerization terminator, methanol. Since the monomers added have almost completely reacted, the weight ratio of styrene to butadiene in the styrene-butadiene-styrene-butadiene-styrene pentablock copolymer of Embodiment 1 is around 85:15.

The polymer solution (about 974 kg) and 30 kg of a silica-supported Pt/Re hydrogenation catalyst provided by DOW Chemical Company are added into a 500 gal loop reactor. The hydrogenation reaction step 14 is conducted at a high temperature of 170° C. and a high pressure of 40 kg/cm$^2$ for at least 4 hours. After the hydrogenation reaction is completed (i.e. the hydrogen consumption stops), cool down and reduce pressure for releasing the redundant hydrogen. The hydrogenation level thereof is greater than 99%, which is determined by UV-VIS spectrophotometry at a wavelength of 260.5 nm.

Most of the hydrogenation catalyst can be isolated from the polymer solution by a filtration step 16 for catalyst recovery (step 17). The hydrogenated polymer solution is firstly filtered by a FUNDABAC filter, and further filtered by using a bag filter for subsequently isolating the hydrogenation catalyst of smaller sizes. Finally, the filtered polymer solution is transferred to a buffer tank 30, and an antioxidant Irganox 1010 (available from Ciba) is then added into the filtered polymer solution (step 18).

In the embodiment of the invention, the process for removing the solvent includes two steps 20 and 22. The hydrogenated and filtered polymer solution is transferred to a heat exchanger 40 via a delivery conduit 35, and is heated by the heat exchanger 40 to be maintained at a high temperature of about 230° C. and at a pressure of about 23 Bar. The heated polymer solution is continuously transferred to a flash tank 50 to remove most of the solvent by flash devolatilization at a temperature of about 230° C. and a pressure of about 1~2 Bar via a delivery conduit 45 that is maintained at a temperature and a pressure similar to that of the heat exchanger 40, and thus a concentrated polymer solution is obtained. The removed solvent is then condensed and transferred via a conduit 60 for solvent recovery (step 21). After the first solvent removal step 20, the concentrated polymer solution is estimated to contain a residual solvent in an amount of about 10 weight percent based on the total weight of the concentrated polymer solution.

The second solvent removal step 22 is for substantially removing the residual solvent from the concentrated polymer solution, and the removed residual solvent can be also recovered (step 23). The second solvent removal step 22 is conducted by transferring the concentrated polymer solution to a twin-screw extruder 80 (JSW TEX alpha-54) via a delivery conduit 55 by a gear pump 70, and is performed at a pressure below 10 torr and at a temperature of about 230° C. for an appropriate time period, e.g., 2 to 10 minutes. After the solvent removal step 22, the resulting pentablock copolymer of styrene-butadiene-styrene-butadiene-styrene can be formed into pellets by a pelletizer (step 24).

The process parameters of the embodiments of the present invention are listed in the following tables.

TABLE 1

| | | Styrene - Butadiene - Styrene - Butadiene - Styrene Block Copolymer | | |
|---|---|---|---|---|
| | | Embodiment 1 | Embodiment 2 | Embodiment 3 |
| Polymerization Reaction | Feedstock | 800 kg cyclohexane in 2000 L reactor with 149 kg Styrene and 25 kg Butadiene | 800 kg cyclohexane in 2000 L reactor with 144 kg Styrene and 16 kg Butadiene | 800 kg cyclohexane in 2000 L reactor with 120 kg Styrene and 40 kg Butadiene |
| | Weight Ratio (Styrene:Butadiene) | 85:15 | 90:10 | 75:25 |
| | Polymerization Start Temperature | 50° C. | 50° C. | 53° C. |
| Hydrogenation Reaction | Feedstock | 974 kg polymer solution with 30 kg catalyst in 500 gal Loop Reactor | 960 kg polymer solution with 30 kg catalyst in 500 gal Loop Reactor | 960 kg polymer solution with 30 kg catalyst in 500 gal Loop Reactor |
| | Conditions | 40 kg/cm$^2$ and 170° C. for at least 4 hrs | 40 kg/cm$^2$ and 170° C. for at least 4 hrs | 40 kg/cm$^2$ and 170° C. for at least 4 hrs |
| | Hydrogenation level | Above 99% | Above 99% | Above 99% |
| Removal of Solvent (1) | Heat exchanger Pressure | 23 Bar | 23 Bar | 21 Bar |
| | Heat exchanger Temperature | 230° C. | 230° C. | 220° C. |
| | Flash tank Pressure | 1~2 Bar | 1~2 Bar | 3~4 Bar |
| | Flash tank Temperature | 230° C. | 230° C. | 220° C. |
| | Residual solvent content | Below 10 wt % | Below 10 wt % | Below 15 wt % |
| Removal of Solvent (2) | Pressure | Below 5 torr | Below 5 torr | Below 5 torr |
| | Temperature | 230° C. | 230° C. | 250° C. |
| Pelletilization | Pellet YI | Below 1 | Below 1 | Below 1 |
| | Cyclohexane Residual | Under 500 ppm | Under 500 ppm | Under 500 ppm |

| | | Embodiment 4 | Embodiment 5 |
|---|---|---|---|
| Polymerization Reaction | Feedstock | 800 kg cyclohexane in 2000 L reactor with 116 kg Styrene and 50 kg Butadiene | 800 kg cyclohexane in 2000 L reactor with 90 kg Styrene and 60 kg Butadiene |
| | Weight Ratio (Styrene:Butadiene) | 70:30 | 60:40 |
| | Polymerization Start Temperature | 55° C. | 56° C. |
| Hydrogenation Reaction | Feedstock | 966 kg polymer solution with 30 kg catalyst in 500 gal Loop Reactor | 950 kg polymer solution with 30 kg catalyst in 500 gal Loop Reactor |
| | Conditions | 40 kg/cm$^2$ and 170° C. for at least 4 hrs | 40 kg/cm$^2$ and 170° C. for at least 4 hrs |
| | Hydrogenation level | Above 99% | Above 99% |
| Removal of Solvent (1) | Heat exchanger Pressure | 20 Bar | 20 Bar |
| | Heat exchanger Temperature | 220° C. | 220° C. |
| | Flash tank Pressure | 3~4 Bar | 3~4 Bar |
| | Flash tank Temperature | 220° C. | 220° C. |
| | Residual solvent content | Below 15 wt % | Below 25 wt % |
| Removal of Solvent (2) | Pressure | Below 5 torr | Below 5 torr |
| | Temperature | 250° C. | 260° C. |
| Pelletilization | Pellet YI | Below 1 | Below 1 |
| | Cyclohexane Residual | Under 500 ppm | Under 500 ppm |

TABLE 2

Styrene - Isoprene - Styrene - Isoprene - Styrene Block Copolymer

| | | Embodiment 6 | Embodiment 7 | Embodiment 8 |
|---|---|---|---|---|
| Polymerization Reaction | Feedstock | 800 kg cyclohexane in 2000 L reactor with 144 kg Styrene and 16 kg Isoprene | 800 kg cyclohexane in 2000 L reactor with 149 kg Styrene and 25 kg Isoprene | 800 kg in cyclohexane 2000 L reactor with 128 kg Styrene and 32 kg Isoprene |
| | Weight Ratio (Styrene:Isoprene) | 90:10 | 85:15 | 80:20 |
| | Polymerization Start Temperature | 50° C. | 50° C. | 50° C. |
| Hydrogenation Reaction | Feedstock | 960 kg polymer solution with 30 kg catalyst in 500 gal Loop Reactor | 974 kg polymer solution with 30 kg catalyst in 500 gal Loop Reactor | 960 kg polymer solution with 30 kg catalyst in 500 gal Loop Reactor |
| | Conditions | 40 kg/cm$^2$ and 170° C. for at least 4 hrs | 40 kg/cm$^2$ and 170° C. for at least 4 hrs | 40 kg/cm$^2$ and 170° C. for at least 4 hrs |
| | Hydrogenation level | Above 99% | Above 99% | Above 99% |
| Removal of Solvent (1) | Heat exchanger Pressure | 23 Bar | 23 Bar | 23 Bar |
| | Heat exchanger Temperature | 230° C. | 230° C. | 230° C. |
| | Flash tank Pressure | 1~2 Bar | 1~2 Bar | 1~2 Bar |
| | Flash tank Temperature | 230° C. | 230° C. | 230° C. |
| | Residual solvent content | Below 10 wt % | Below 10 wt % | Below 10 wt % |
| Removal of Solvent (2) | Pressure | Below 5 torr | Below 5 torr | Below 5 torr |
| | Temperature | 230° C. | 230° C. | 230° C. |
| Pelletilization | Pellet YI | Below 1 | Below 1 | Below 1 |
| | Cyclohexane Residual | Under 500 ppm | Under 500 ppm | Under 500 ppm |

| | | Embodiment 9 | Embodiment 10 |
|---|---|---|---|
| Polymerization Reaction | Feedstock | 800 kg cyclohexane in 2000 L reactor with 116 kg Styrene and 50 kg Isoprene | 800 kg cyclohexane in 2000 L reactor with 90 kg Styrene and 60 kg Isoprene |
| | Weight Ratio (Styrene:Isoprene) | 70:30 | 60:40 |
| | Polymerization Start Temperature | 55° C. | 56° C. |
| Hydrogenation Reaction | Feedstock | 966 kg polymer solution with 30 kg catalyst in 500 gal Loop Reactor | 950 kg polymer solution with 30 kg catalyst in 500 gal Loop Reactor |
| | Conditions | 40 kg/cm$^2$ and 170° C. for at least 4 hrs | 40 kg/cm$^2$ and 170° C. for at least 4 hrs |
| | Hydrogenation level | Above 99% | Above 99% |
| Removal of Solvent (1) | Heat exchanger Pressure | 21 Bar | 20 Bar |
| | Heat exchanger Temperature | 220° C. | 220° C. |
| | Flash tank Pressure | 2~3 Bar | 2~3 Bar |
| | Flash tank Temperature | 220° C. | 220° C. |
| | Residual solvent content | Below 15 wt % | Below 25 wt % |
| Removal of Solvent (2) | Pressure | Below 5 torr | Below 5 torr |
| | Temperature | 250° C. | 250° C. |
| Pelletilization | Pellet YI | Below 1 | Below 1 |
| | Cyclohexane Residual | Under 500 ppm | Under 500 ppm |

In the resulting styrene-butadiene-styrene-butadiene-styrene block copolymers and styrene-isoprene-styrene-isoprene-styrene block copolymers, the remained amounts of the cyclohexane solvent of the block copolymers are below 500 ppm, and the Yellowness Index (YI) values of the resulting polymer pellets determined by spectrophotometer (SE2000 avaliable from Nippon Denshoku Kogyo Industries Co., Ltd.) are below 1, which indicate that the resulting block copolymers have an excellent transparency and a good light stability.

Although a specific preferred embodiments of the present invention have been described in the detailed description above, the description is not intended to limit the invention to the particular forms of embodiments disclosed therein, since they are to be recognized as illustrative rather than restrictive and it will be obvious to those skilled in the art that the invention is not so limited. Persons skilled in the art should understand that they could make various changes, substitutions and alterations herein without departing from the spirit and scope of the invention in its broadest form.

The invention claimed is:

1. A method for manufacturing a substantially hydrogenated block copolymer, comprising:
    hydrogenating a block copolymer of a vinyl aromatic polymer block and a conjugated diene polymer block by contacting with a hydrogenating agent in the presence of a hydrogenation catalyst to obtain a polymer solution including a hydrogenated block copolymer having a hydrogenation level of greater than 90 percent and a solvent;

filtering said polymer solution before removing said solvent from said polymer solution;

adding an antioxidant into said polymer solution after filtering said polymer solution, removing said solvent from said polymer solution by a flash devolatilization at a temperature of 200 to 300° C. and a pressure of 1 to 10 Bar to obtain a concentrated polymer solution with a residual solvent in an amount of 1 to 50 weight percent based on the total weight of said concentrated polymer solution; and removing said residual solvent from said concentrated polymer solution by a devolatilizer at a pressure below 100 torr to isolate said hydrogenated block copolymer.

2. The method as recited in claim 1, wherein said vinyl aromatic polymer block is polymerized from styrene.

3. The method as recited in claim 1, wherein said conjugated diene polymer block is polymerized from butadiene or isoprene.

4. The method as recited in claim 1, wherein said block copolymer is a copolymer polymerized from at least a vinyl aromatic and at least a conjugated diene monomer.

5. The method as recited in claim 1, wherein said block copolymer has a number average molecular weight of 40000 to 150000.

6. The method as recited in claim 1, wherein a weight ratio of said vinyl aromatic polymer block to said conjugated diene polymer block in said block copolymer is from about 40:60 to about 90:10.

7. The method as recited in claim 1, wherein said solvent comprises a non-polar solvent.

8. The method as recited in claim 7, wherein said solvent comprises cyclohexane.

9. The method as recited in claim 1, wherein said hydrogenation catalyst includes a Group VIII metal component and at least one component selected from a group consisting of a rhenium, molybdenum, tungsten, tantalum, niobium and platinum.

10. The method as recited in claim 9, wherein said hydrogenation catalyst includes a silica support.

11. The method as recited in claim 1, wherein said devolatilizer comprises a twin-screw extruder, a film evaporator, a double flash tank or an assembly of the above.

12. The method as recited in claim 1, wherein said antioxidant comprises a hindered phenolic antioxidant and/or a phosphate ester antioxidant, and a decomposition temperature of said antioxidant is more than 150° C.

13. The method as recited in claim 1, wherein said hydrogenating agent comprises hydrogen gas, hydrazine or sodium borohydride.

14. The method as recited in claim 1, wherein said block copolymer is formed by using a polymerization initiator, said polymerization initiator comprising an organolithium compound.

15. The method as recited in claim 1, wherein said polymer solution is maintained at a pressure of 9 to 30 Bar before entering into a flask tank to remove said solvent from said polymer solution by said flash devolatilization.

16. The method as recited in claim 15, wherein said polymer solution is preheated to be maintained at a temperature range of 200 to 300° C. before entering into said flask tank to remove said solvent from said polymer solution by said flash devolatilization.

17. The method as recited in claim 1, wherein said step of removing said residual solvent from said concentrated polymer solution is performed by a twin-screw extruder at a temperature of 200 to 300° C.

18. The method as recited in claim 1, wherein said hydrogenation level is greater than 95 percent.

19. The method as recited in claim 1, wherein said step of removing said residual solvent from said concentrated polymer solution by said devolatilizer is performed at a pressure below 20 torr to isolate said hydrogenated block copolymer.

* * * * *